(12) United States Patent
Roeske

(10) Patent No.: US 8,567,085 B2
(45) Date of Patent: Oct. 29, 2013

(54) TAPE MEASURE WITH SEALABLE CLEANING APERTURE

(76) Inventor: Jeffrey Norman Roeske, Caledonia, MI (US)

( * ) Notice: Subject to any disclaimer, the term of this patent is extended or adjusted under 35 U.S.C. 154(b) by 173 days.

(21) Appl. No.: 13/327,885

(22) Filed: Dec. 16, 2011

(65) Prior Publication Data

US 2012/0167403 A1 Jul. 5, 2012

Related U.S. Application Data

(60) Provisional application No. 61/429,274, filed on Jan. 3, 2011.

(51) Int. Cl.
*G01B 3/10* (2006.01)

(52) U.S. Cl.
USPC .............................................. 33/769

(58) Field of Classification Search
USPC .................................... 33/413, 414, 761, 769
See application file for complete search history.

(56) References Cited

U.S. PATENT DOCUMENTS

| | | | |
|---|---|---|---|
| 2,942,348 A * | 6/1960 | Caruso | 33/761 |
| 3,220,112 A * | 11/1965 | Quenot | 33/769 |
| 3,716,201 A | 2/1973 | West et al. | |
| 3,889,897 A | 6/1975 | Van Zelderen | |
| 4,067,513 A | 1/1978 | Rutty et al. | |
| 4,068,383 A | 1/1978 | Krebs | |
| 4,228,589 A | 10/1980 | Chemay | |
| 4,434,952 A | 3/1984 | Czerwenski et al. | |
| D303,772 S | 10/1989 | Maier et al. | |
| 5,007,178 A * | 4/1991 | Dewire et al. | 33/767 |
| 5,210,956 A * | 5/1993 | Knispel et al. | 33/761 |
| D344,187 S | 2/1994 | Haskins | |
| 5,644,852 A | 7/1997 | Fuller et al. | |
| 6,382,547 B1 * | 5/2002 | Yang | 33/769 |
| 6,691,426 B1 * | 2/2004 | Lee et al. | 33/769 |
| 7,334,344 B2 * | 2/2008 | Scarborough | 33/759 |
| 7,600,327 B2 * | 10/2009 | Sharp | 33/769 |
| 2003/0233762 A1 * | 12/2003 | Blackman et al. | 33/769 |
| 2008/0028628 A1 * | 2/2008 | Campbell et al. | 33/668 |
| 2012/0036727 A1 * | 2/2012 | McCarthy | 33/760 |

* cited by examiner

*Primary Examiner* — G. Bradley Bennett
(74) *Attorney, Agent, or Firm* — Kane & Co., PLC; Barry C. Kane; Eric Hultman

(57) ABSTRACT

A tape measure assembly with a cleaning aperture is disclosed herein and comprises a central spool upon which a measuring tape containing linear markings is coiled and stored. A protective housing or case surrounds the central spool and allows pivotal rotation of the central spool mounted therein. A cleaning aperture is provided through the protective housing to allow access to the measuring tape and spool without disassembly of the protective housing. An easily removable plug is used to seal the cleaning aperture when not in use to preventing ingress of debris through the cleaning aperture.

20 Claims, 17 Drawing Sheets

TAPE MEASURE WITH SEALABLE CLEANING APERTURE

CROSS REFERENCE TO RELATED APPLICATION

This application is a non-provisional application claiming priority to an earlier filed U.S. provisional patent application entitled, "TAPE MEASURE WITH SEALABLE CLEANING APERTURE," assigned Ser. No. 61/429,274, and filed Jan. 3, 2011, the contents of which are incorporated herein by reference.

BACKGROUND OF THE INVENTION

1. Field of the Invention

This invention relates to tape measures in general and more particularly to reel type tape measuring tapes contained within an enclosure.

2. Brief Discussion of the Related Art

A tape measure represents a flexible form of linear rule, typically consisting of a ribbon or tape of cloth, plastic, fiberglass, or metallic strip of a uniform width containing measurement markings along its length. This style of measuring device provides advantages over a traditional fixed rule in that it is collapsible and easily stored in a coiled form.

One common form of tape measure that is well known in the construction industry retains the measuring tape by coiling it around a spool contained within a protective housing. The spool is pivotally mounted within the housing, allowing for free rotation therein. A retraction mechanism is then placed into the housing, allowing for the spool to be rotated within the housing for winding the tape upon the spool. The protective housing further contains a passageway allowing the tape to pass from the spool to outside of the protective housing. The preferred passageway is sized to be slightly larger than the width and thickness of the tape, rectangular in profile, and is located tangent to the diameter of the spool so as to allow the tape to pass without binding.

Tape measures, such as the construction model described above, are often used in locations where particulate matter such as sawdust and powders from metal or masonry products are present. In their typical application, tape measures are placed onto a work surface and a measurement is read between two or more points. When used in this manner debris contained on the work surface may adhere to the tape. Subsequent retraction of the tape then transports the debris inside the protective housing where it becomes trapped, unable to exit through the housing's small passageway. Once debris is trapped inside the tape measure's protective housing it will continue to accumulate and eventually foul the tape measure's internal mechanisms. Once fouling has occurred, the tape will no longer return to be stored on the spool rendering the device inoperable.

One prior art solution to the release of debris accumulation involves removal of the spool from the protective housing. Oftentimes, the protective housings of the construction models noted above contain two or more pieces which are separable. In order to clean the device, one may simply reverse the assembly process by releasing the fasteners which retain the housing. Once the tape and retraction mechanisms are exposed, they may then be cleaned.

However, once the case is opened and the spool is exposed the user may inadvertently release tension from the winding mechanism. This winding mechanism is oftentimes a pre-tensioned spring anchored between the housing and the spool. This spring applies a rotational bias causing the tape to coil upon the spool for storage. If this rotation bias is relieved, such as when the spring loses tension, the device will no longer retract. Since one end of the spring is often anchored to the housing itself, disassembly of the housing oftentimes relieve the spring's tension requiring the spring to be re-wound after the cleaning is completed. This rewinding of the spring is a complex and time consuming task. Oftentimes it is simply more economical to replace the entire tape measure rather then expend the time necessary to disassemble the old housing, clean and rewind the spring. As a result, there is a need to find a low cost method which allows for the particulate matter to be cleaned from the housing of a tape measure, preferably without the use of tools and which does not require disassembly of the housing or replacement of the reel cartridge inside.

SUMMARY OF THE INVENTION

Many tool owners prefer to maintain their own tools to prevent or alleviate mechanical malfunctions. The invention described and claimed herein provides a cleaning port or aperture in a tape measure's protective housing allowing a user to expose the tape and spool making them available for cleaning without disassembly of the outer protective housing.

According to one embodiment of the invention, a tape measure assembly comprises a central spool upon which a measuring tape containing linear markings is coiled and stored. A protective housing or case surrounds and allows pivotal rotation of the spool centrally mounted therein. A cleaning aperture is provided through the protective housing allowing access to the measuring tape and spool without disassembly of the protective housing thereby allowing debris to be cleaned from the housing.

According to another form of the invention, the tape measure assembly comprises a central spool upon which a measuring tape containing linear markings is coiled and stored. A protective housing or case surrounds and allows pivotal rotation of the spool centrally mounted therein. A cleaning aperture is provided through the protective housing allowing access to the measuring tape and spool without disassembly of the protective housing thereby allowing debris to be cleaned from the housing. An easily removable plug seals the cleaning aperture preventing ingress of debris through the cleaning aperture and into the protective housing.

In addition to the variations to the tape measure assembly, differences in the cleaning aperture may be desired. In one embodiment of the invention the cleaning aperture is circular in shape. In another variation of the invention the cleaning aperture is rectangular in shape. In yet another embodiment of the invention the cleaning aperture is oblong in shape. In still yet another embodiment of the invention the cleaning aperture is irregular in shape. In a further embodiment of the invention, the cleaning aperture is polygonal in shape.

In addition to the variations to the aperture, differences in manner of closing the aperture may be desired. One embodiment of the invention includes a plug closing the cleaning aperture. In another embodiment of the invention a sliding door closes the cleaning aperture. In yet another embodiment of the invention a hinged door closes the cleaning aperture. In still yet another embodiment, the hinged door includes a biasing member closing the door. In a further embodiment of the invention, the door may be retained in a closed position by a latch. In a still further embodiment of the invention the door may be retained in a closed position by a latch, which is subsequently retained by a safety catch.

Different methods of sealing the cleaning aperture may be utilized including various shapes, styles, and materials as may suit the end user. The examples above are provided to enable the invention and should not be read to be limiting, as the actual location, size, shape, and position of both the aperture and its seal may vary from the above disclosed locations. The foregoing and other objects, features, and advantages of the invention will become more apparent from the following description and from the claims.

BRIEF DESCRIPTION OF THE DRAWING FIGURES

Various illustrative systems, methods, devices, features, and advantages of the invention are described below with reference to the appended drawings, which may not be drawn to scale and in which like parts are designated by like reference designations, wherein.

Figure 11A:
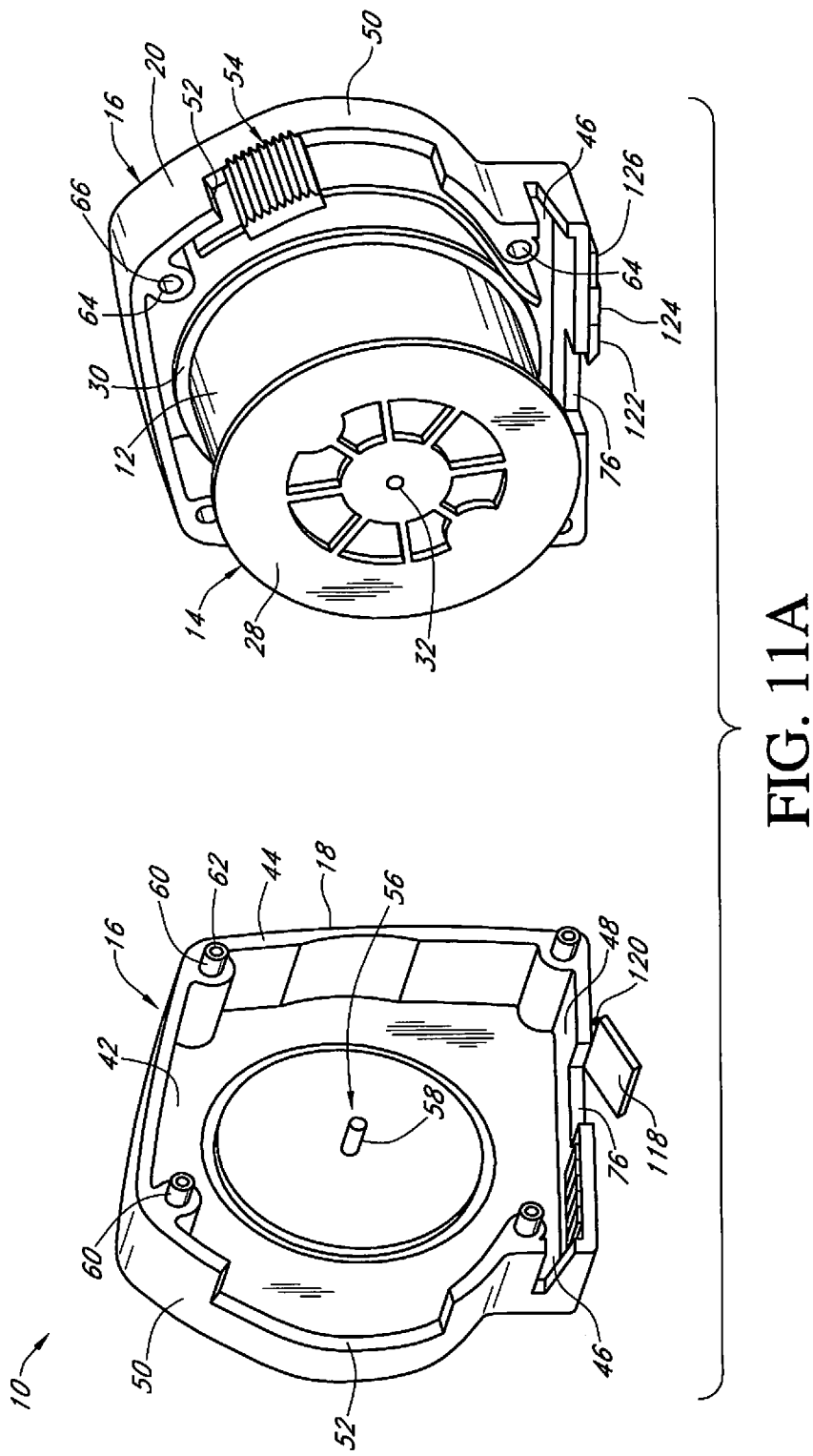
Figure 11B:
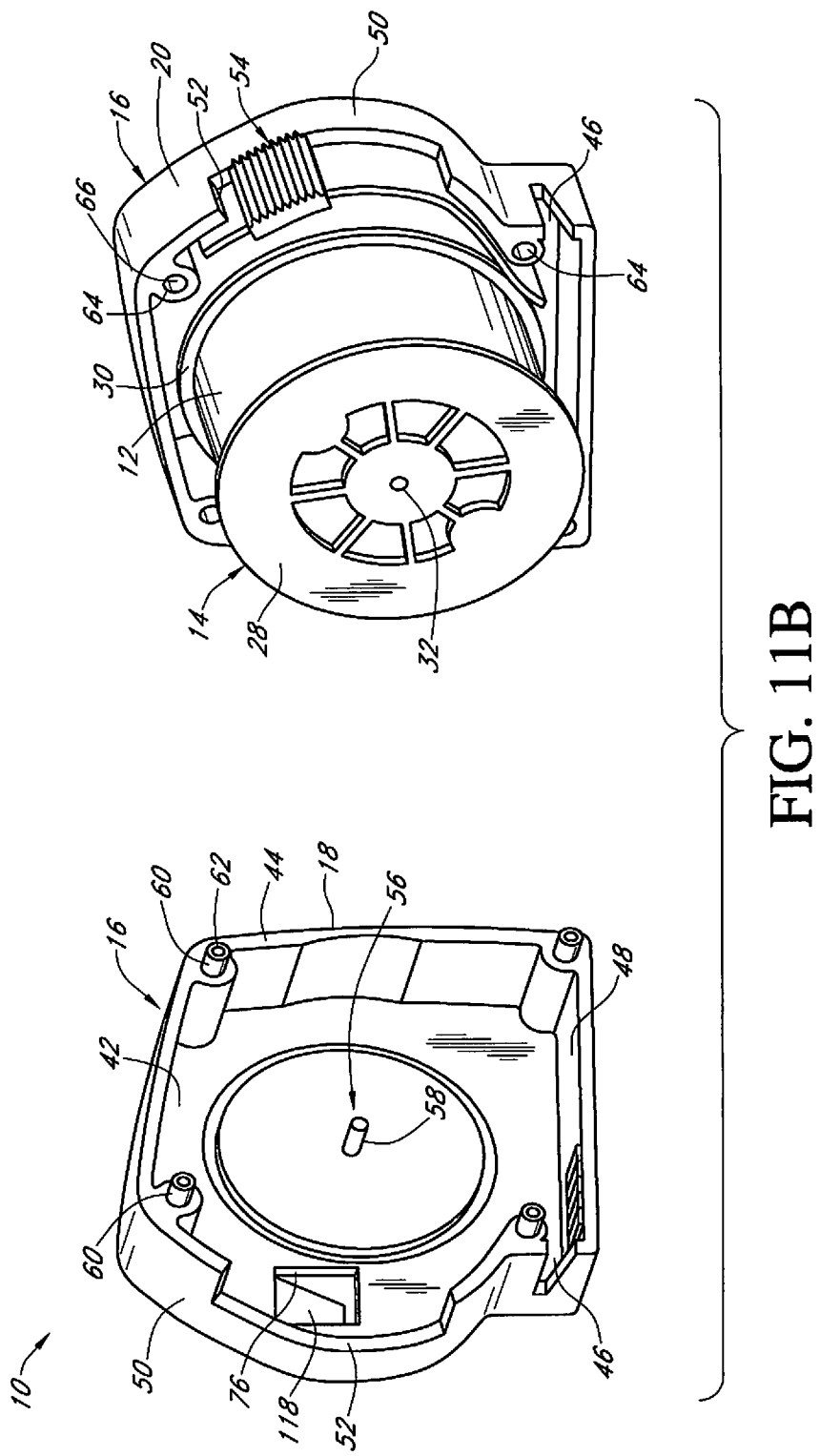
Figure 12A:
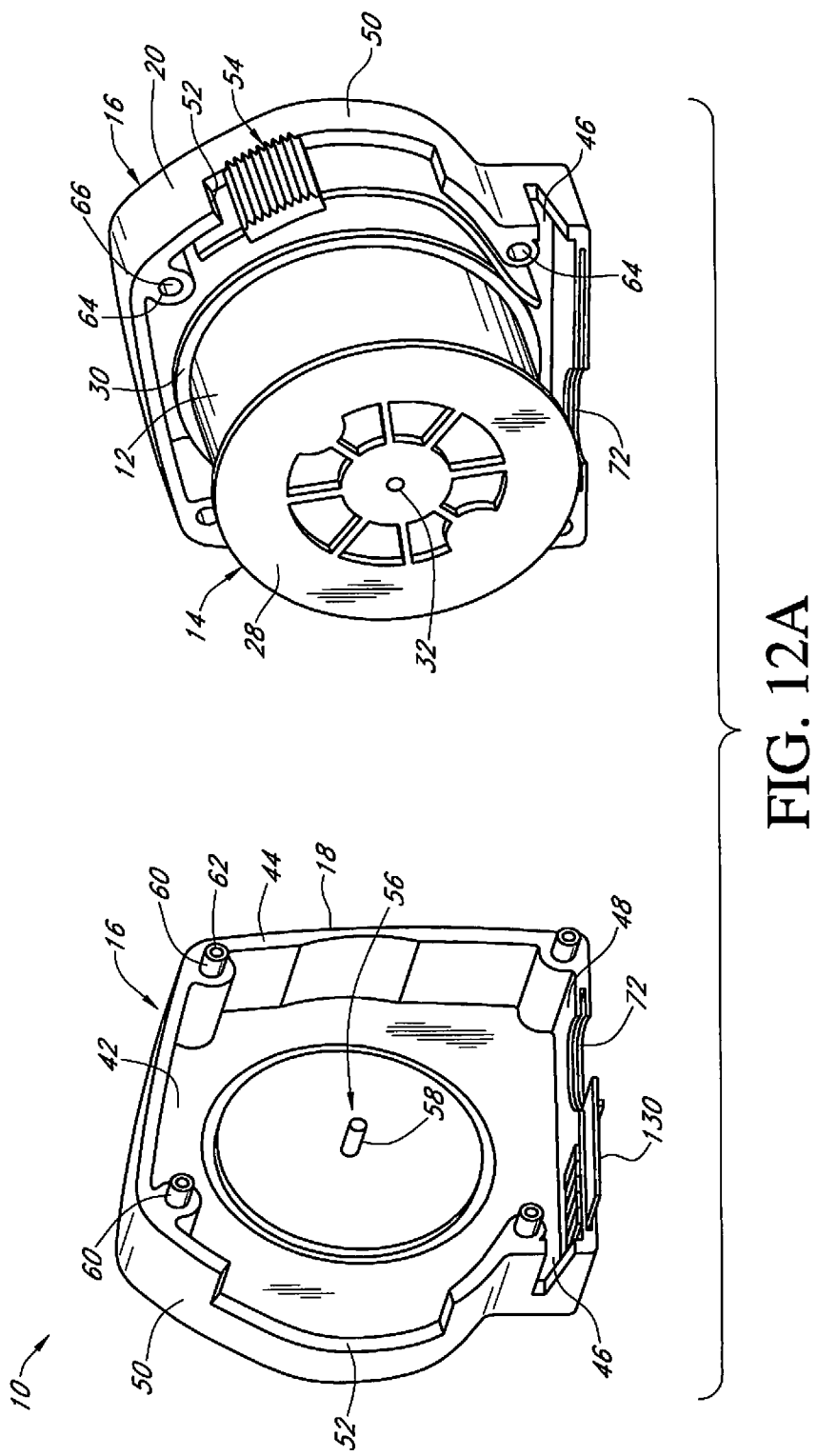
Figure 12B:
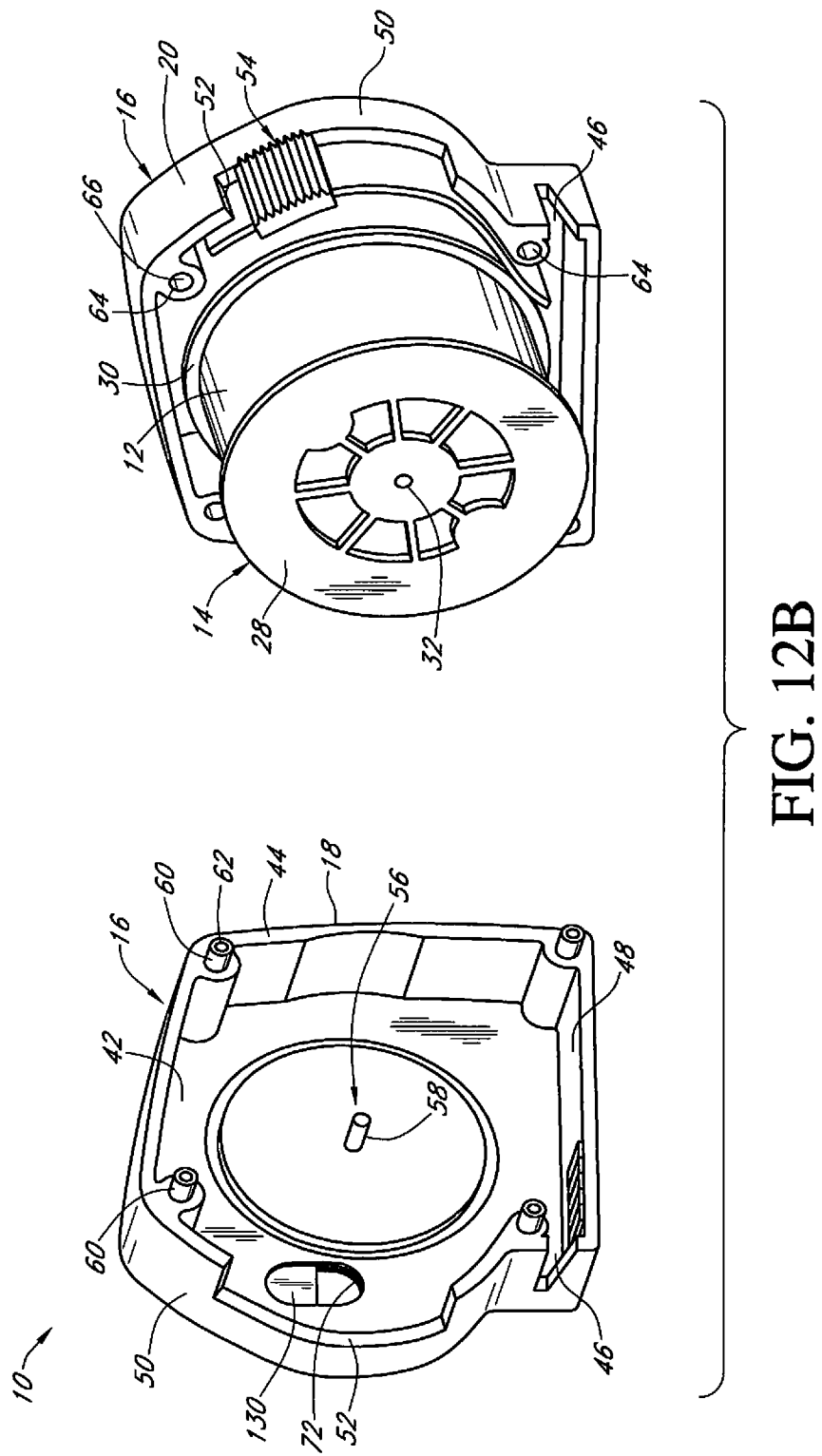

FIG. 11 is a perspective view of another form of the invention having a rectangular cleaning aperture, door closure and retention mechanism; and FIG. 12a is a partially exploded view of yet another form of the invention showing a sliding door sealing a cleaning aperture located in the base; and FIG. 12b is partially exploded view of yet another form of the invention showing a sliding door sealing a cleaning aperture located in the sidewall.

DESCRIPTION OF THE VARIOUS EMBODIMENTS

When referring to the figures like reference numerals designate like elements throughout, while the different Figures may illustrate various embodiments of the present invention. The embodiments illustrated and discussed herein are presented for the sole purpose of enabling one to make and use the invention, is not exhaustive, and should not be understood as limiting in any way. Moreover, the invention described herein is directed to tape measures contained within a protective housing, and more specifically but not limited to, models containing a pre-tensioned spool for the retraction of the tape into the protective housing. Models containing manual retraction methods, such as a hand crank, are also anticipated, although only the self retracting model is discussed herein.

The range of tape measure types, their constructions, and designs are expansive and beyond the scope of this document therefore it is impractical to include a comprehensive list of all possible variations of tape measures and the materials comprising their manufacture. Properties of tape measures vary with their design, shape and materials used in their construction, however almost universally, the housing contains a rigid shell containing and protecting the rule or tape as is shown by the tape measure assembly shown in FIG. 1.

Figure 1:
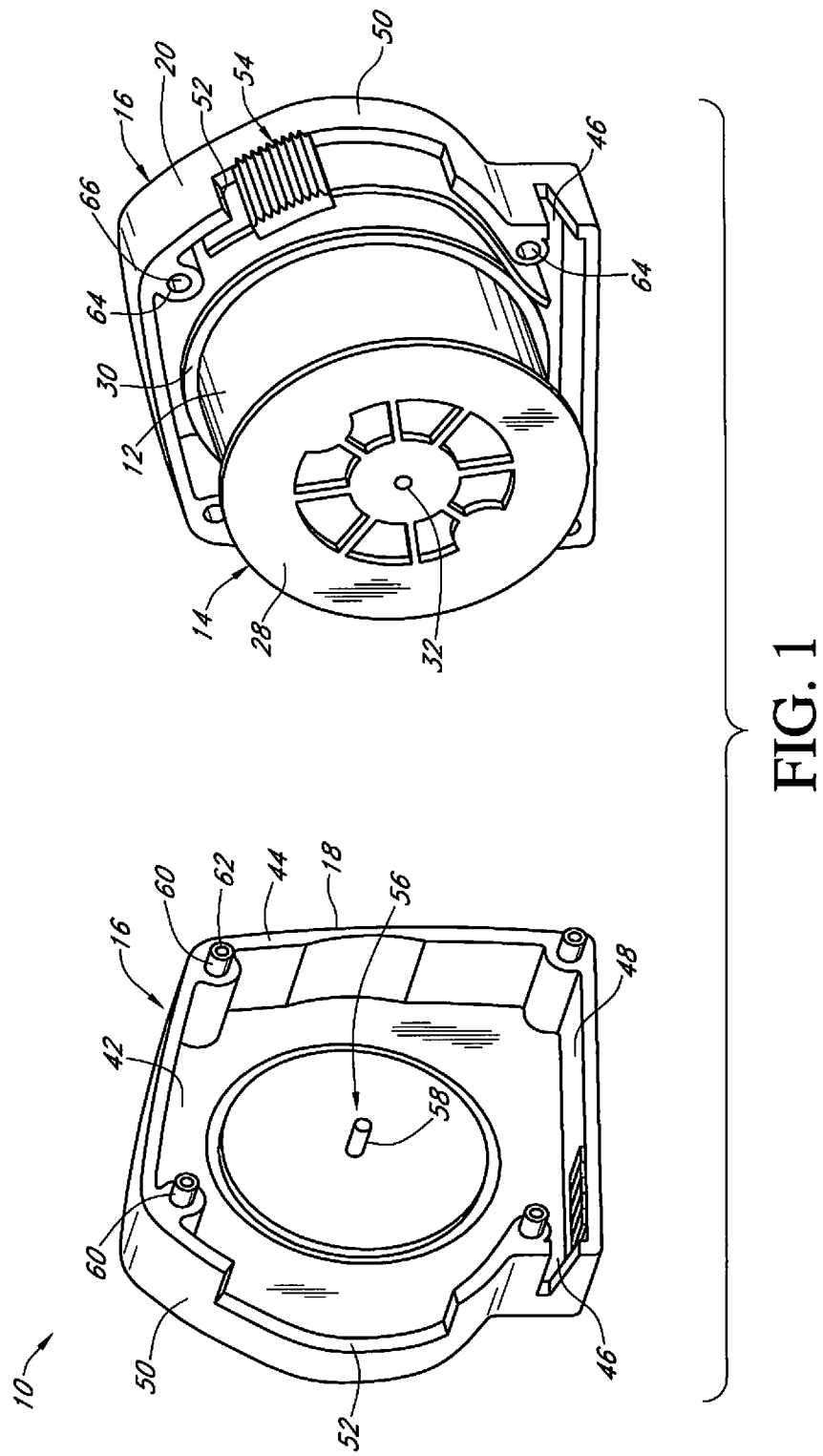
FIG. 1 is a partially exploded view of a tape measure.
Figure 2:
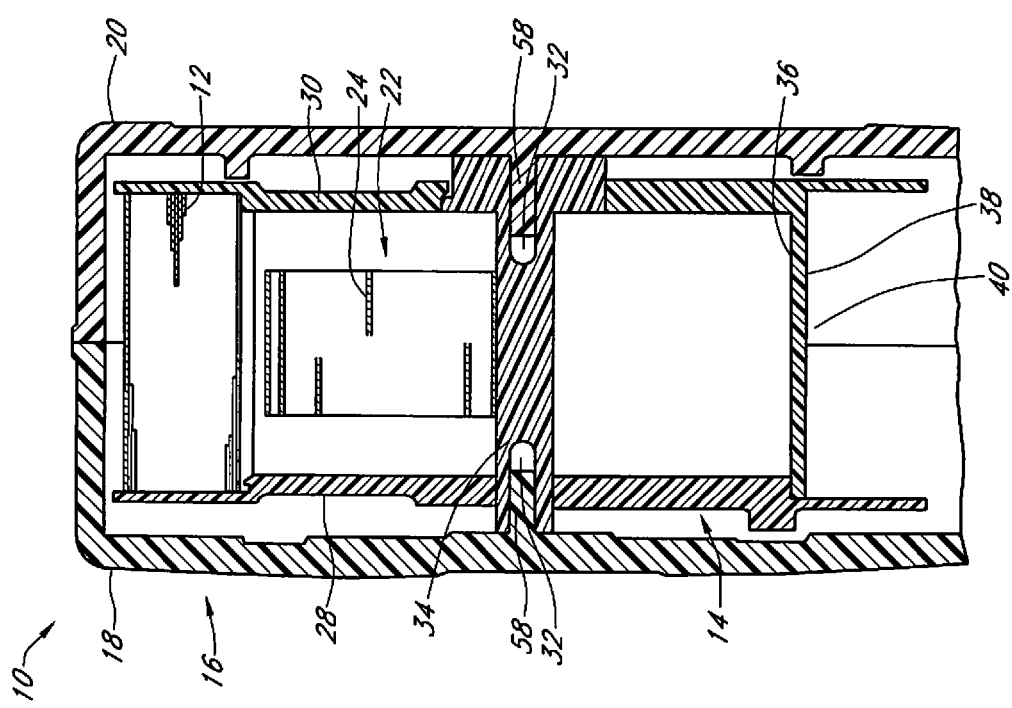
FIG. 2 is a fragmentary transverse sectional view of the measuring tape shown in FIG. 1 taken vertically through the center mounting pin.

A tape measure is shown generally at 10 in FIG. 1 and by a section taken through the center of the tape measure vertically as shown in FIG. 2. Tape measure 10 comprises a measuring tape 12, wound around a spool assembly 14 which is contained within a protective housing 16, which is typically constructed of two halves 18, 20. The tape measure 10 also typically includes a tape retraction mechanism shown generally at 22 and which is a spring motor 24 in this example.

The measuring tape 12 is a flexible form of linear rule, typically consisting of a ribbon of cloth, plastic, fiberglass, or metallic strip of a uniform width containing measurement markings along its length. In the embodiment shown in FIGS. 1 and 2, the tape itself is constructed of a tempered steel metallic material that is coated and painted with linear markings. The measuring tape 12 is formed with a curvature 26 in a first direction such that the tape 12 provides a resistance against bending in a second an opposite direction. This curvature 26 allows the tape to remain rigid when extended from the spool 14, yet also allows the tape 12 to freely bend in the first direction allowing the tape to be freely coiled onto a spool assembly 14 for storage.

The spool assembly 14 comprises annular end walls 28, 30 with contain central apertures 32 therein and a cylindrical core 34 extending therebetween and of a greater diameter than the central apertures 32. The inner surface 36 of the cylindrical core 34 and of the end walls 28, 30 define a cylindrical chamber in which is disposed the coiled spring motor 24. The outer surface 38 of the core 34 and the inner surfaces of the end walls 28, 30 define an annular recess 40 into which the measuring tape 12 is seated. The spool assembly 14 may be molded from various plastic materials, including glass filed polymers, or may be cast, forged or machined from metallic materials such as aluminum, steel, zinc, or brass which are selected for their galvanic and chemical compatibility with the materials used in the measuring tape 12.

The protective housing 16 is typically comprised of two halves 18, 20 each of which has an end wall 42, a peripheral side wall 44, and a tape aperture 46 which is generally rectangular in shape and which lies adjacent a base portion 48 and a front portion 50, extending generally parallel to the base portion 48. The tape aperture 46 is sized to be greater in width and thickness than the measuring tape 12 itself. The protective housing 16 may additionally include an elongated brake aperture 52 which extends parallel to the plane of the side wall 44 and along the front portion 50 of the housing 16 allowing a thumb brake 54 to be installed in a sliding arrangement such that the thumb brake 54 will slidingly seal the tape aperture 46 forcing the measuring tape 12 against the base portion 48 of the housing 16 preventing its extension or retraction. The protective housing 16 may be molded from plastic materials including glass filed polymers, or may be cast, forged or machined from metallic materials such as aluminum, steel, zinc, or brass which are chosen for their impact resistance.

Spool mounting features 56 are shown generally on the inside surfaces of the protective housing's halves 28, 30 and are located centrally inside the peripheral side wall 44 and extend perpendicular to the end wall 42. The spool mounting features 56 are generally circular pins 58, and are sized to mate into the corresponding cylindrical aperture 32 contained on the annular end walls 28, 30 of the spool assembly 14. When the halves 28, 30 of the protective housing 16 are assembled, the spool assembly 14 will be supported by the spool mounting features 54 allowing the spool 14 to be rotatably mounted within the protective housing 16.

Mounting bosses 60 are equidistantly placed along the inside of the peripheral side wall 44 on one of the protective housing's 16 halves 18. These bosses preferably number four or more, with at least one boss located in each corner of the half 18. The mounting bosses 60 may also be drilled or tapped 62 to accept a fastener (not shown). Corresponding to like locations on the opposite half 20, counter sunk apertures 64 are sized to receive and engage the opposite half's mounting bosses 60. The counter sunk apertures are further drilled to allow a fastener's body to pass through a hole 66 in the half 20 and extend into the drilled or tapped hole 62 in the opposite half 18. Fasteners are then placed through the holes 66 fastening the two halves 18, 20 of the protective housing 16 to each other.

Figure 3:
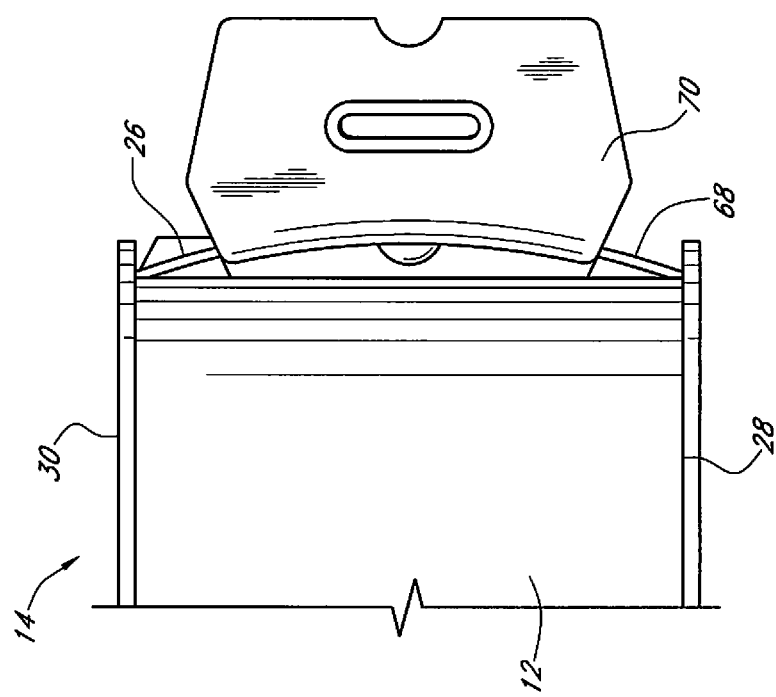
FIG. 3 is a fragmentary view front view of the spool assembly, with measuring tape and tang, coiled thereupon.

Ideally a small potion of the tape should remain accessible outside of the protective housing 16 in its storage configuration, as shown in FIG. 3, such that a user may grasp the end portion 68 of the measuring tape 12 and extend the tape by uncoiling it from the spool assembly 14. The tape aperture 46 serves this purpose, allowing the measuring tape 12 to pass through the protective housing 16 without binding. Additionally, the end portion 68 of the tape 12 is provided with a tab or tang 70 which is affixed to the end of the tape 68 and which extends in a direction perpendicular to the direction of measurement. This tab or tang 70 serves two functions, the first is to prevent retraction of the end portion of the tape within the protective housing 16, and the second is to provide the '0' mark indicating the starting point of the rule portion of the measuring tape 12. Typically the tang 70 is allowed to float in the direction of the length of the tape an amount equivalent to the width of the tang 70 itself. This allows for accurate inside and outside measurements to be read without having to account for the thickness of the tang 70 itself.

When the user releases the measuring tape 12 from an extended position the tape is coiled onto the spool's 14 annular recess 40 by the energy stored by the spring motor 24. During this retraction—any debris (not shown) present on or adhered to the measuring tape 12 are transported into the tape measure 10 through the tape aperture 46, inside the protective housing 16 and is sandwiched between successive layers of tape as they are coiled upon the spool assembly 14. Subsequent use dislodges the debris (not shown) from the measuring tape 12 allowing it to freely traverse within the protective housing 16, passing into the spring motor 24, upon the circular pins 58 and onto other internal mechanical components fouling the respective mechanisms and preventing the proper operation of the measuring tape unit 10

Figure 4A:
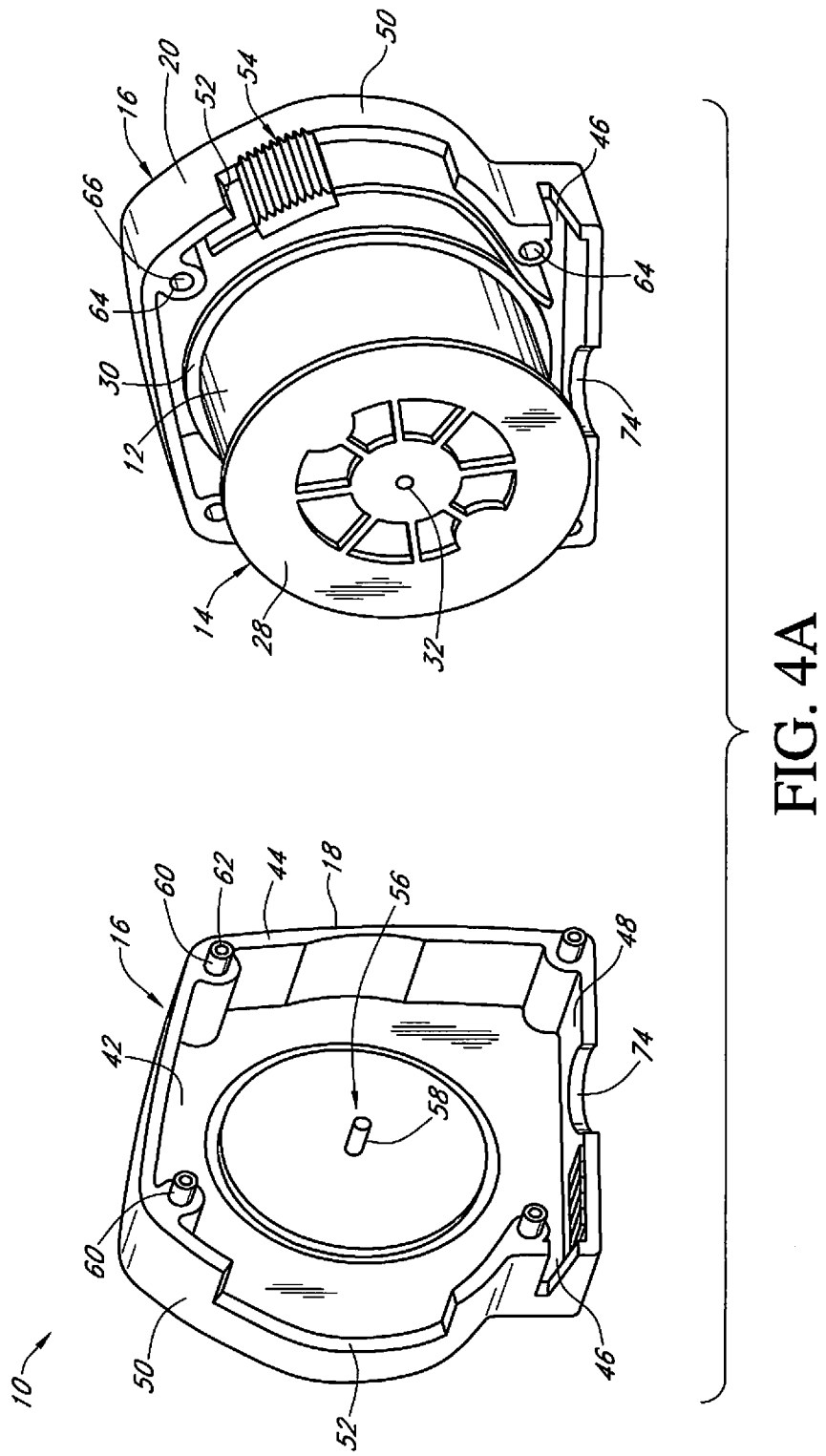
FIG. 4a is a partially exploded view of one form of the invention having a circular cleaning aperture in the base.
Figure 4B:
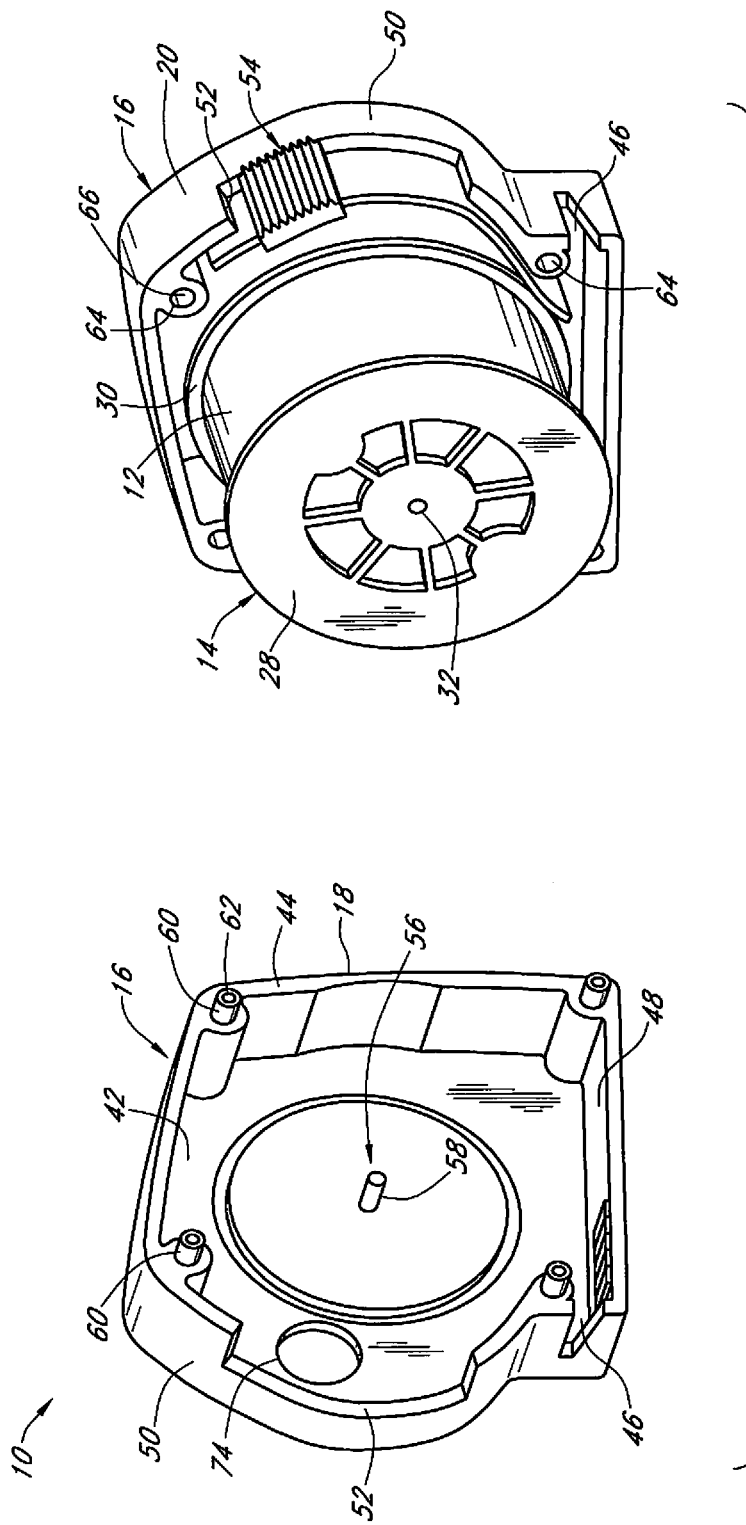
FIG. 4b is a partially exploded view of one form of the invention having a circular cleaning aperture in the sidewall.

One embodiment of the invention is presented in FIGS. 4a and 4b and prevents or rectifies a fouled condition by allowing the debris to be removed from the protective housing 16 via a cleaning aperture 72. In this embodiment of the invention the cleaning aperture 72 is placed through a wall of the protective housing 16 thereby allowing the user to clean the debris out of the assembly. Some anticipated cleaning methods utilizing the cleaning aperture may include: flushing the case with a fluid such as oil, water, or pressurized air; mechanically vibrating the debris free of the spool assembly; brushing the internal components with small brushes such as pipe cleaners, or by rapping the protecting housing against the user's opposite hand. These cleaning methods separate debris from the spool assembly 14, spring motor 24, and the measuring tape 12 allowing the debris to pass from the protective housing 16 via the cleaning aperture 72.

In one embodiment of the invention as shown in FIGS. 4a and 4b, a cleaning aperture 72 passes from the exterior of one or more of the protective housing's 16 peripheral walls 44 into the interior of the protective housing 16 allowing access to the interior of the protective housing 16 without disassembly of the tape measure 10. The cleaning aperture 72 may be oriented or positioned at any location on the protective housing 16 that does not interfere with the customary usage of the tape measure 10 itself. The size and shape of the cleaning aperture 72 is chosen to best accommodate the cleaning of the tape measure 10 and is preferably shaped such that it may be closed or otherwise sealed.

The embodiments of the invention shown in FIGS. 4a and 4b depicts the cleaning aperture to be circular 74 in shape. A second form of the cleaning aperture 76 is shown in FIG. 11 and is rectangular in shape. Other embodiments of the invention encompass geometries such as oblong slots, polygons, ovals, and irregular curves, all which lie within the scope of this invention; however shapes that are easily sealed or enclosed, such as the circular shape 74 in FIG. 4a, are preferred.

It is further anticipated that one or more various covers, plugs, or caps may be used to close the cleaning aperture 72 when the aperture is not actively being used for cleaning. These devices may be collectively referred to as plugs 78 and are used to seal the aperture 72 to prevent debris from reentering the protective housing 16.

Figure 5B:
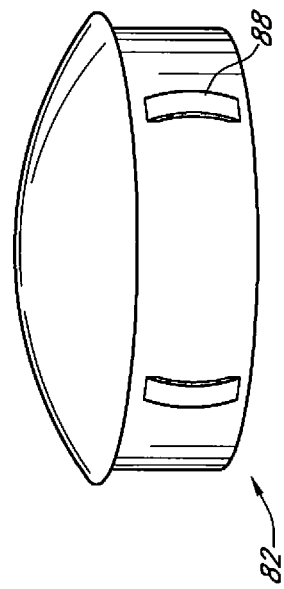
FIGS. 5a-5e are perspective views of plugs for use in closing the invention's cleaning aperture.
Figure 5C:
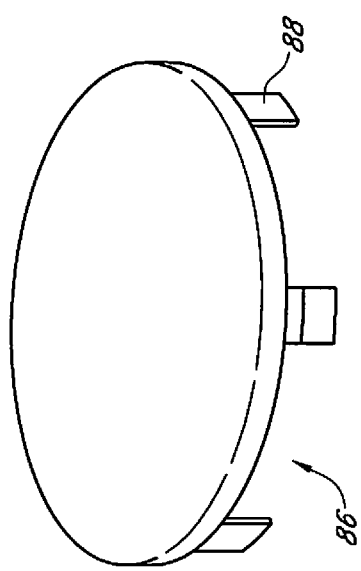
Figure 5A:
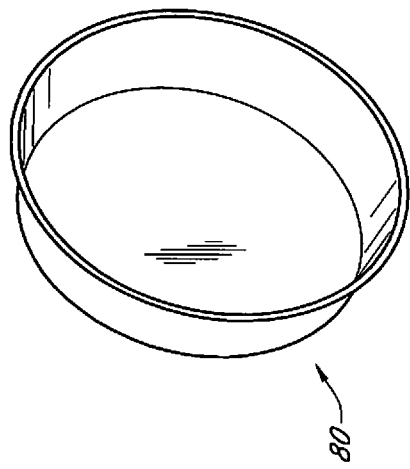
Figure 5E:
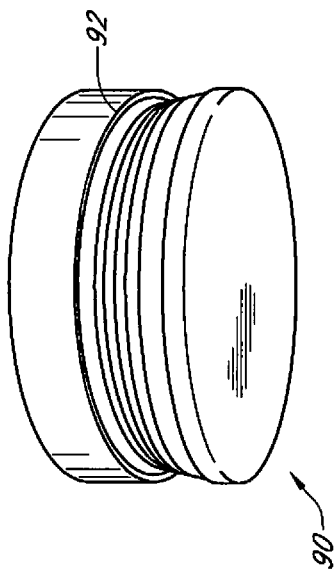
Figure 5D:
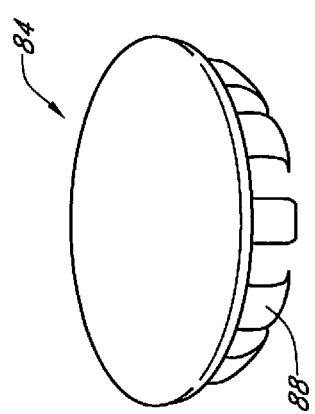

Conventional sealing methods such as press fit plugs 80 through 86 shown in FIGS. 5a through 5e, are well known in the art and available from most hardware stores. The preferred fit for a press fit plus is a transitional or light press fit so that the plugs may be removed without the use of tools. A simple dust cover 80 as shown in FIG. 5a represents one low cost solution to prevent debris accumulation. Press fit end caps 82, 84, 86 as shown in FIG. 5b-5d may also be used and contain retention features 88 to engage the cleaning aperture 72 retaining it in position. A sealed end cap 90 as shown in FIG. 5e may also incorporate a rubber seal or o-ring 92 which engages the walls of the cleaning aperture 72 preventing ingress of fine particular matter or fluids.

Figure 6B:
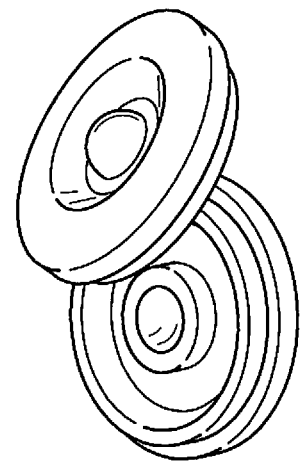
FIGS. 6a-6c are perspective views of rubber stoppers for use in closing the invention's cleaning aperture.
Figure 6C:
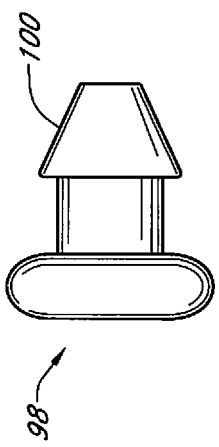
Figure 6A:
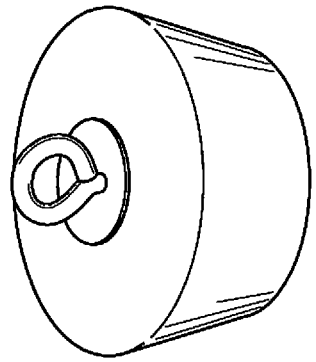

Rubber plugs, such as shown in FIGS. 6a-6c may also be used to seal the cleaning aperture 72 located in the protective housing 16. FIG. 6a shows a simple rubber stopper 94 which is sized to require a press fit into the cleaning aperture 72. FIG. 6b depicts a simple rubber grommet style plug 96 that engages the side walls of the cleaning aperture 72. FIG. 6c depicts a rubber plug 98 with retention feature 100 to prevent loss of the plug 98 when the plug is removed for cleaning.

Figure 7B:
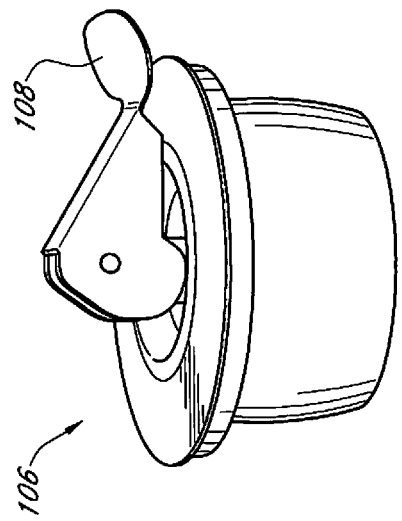
FIGS. 7a and 7b are perspective views of expanding rubber stoppers for using in closing the invention's cleaning aperture.
Figure 7A:
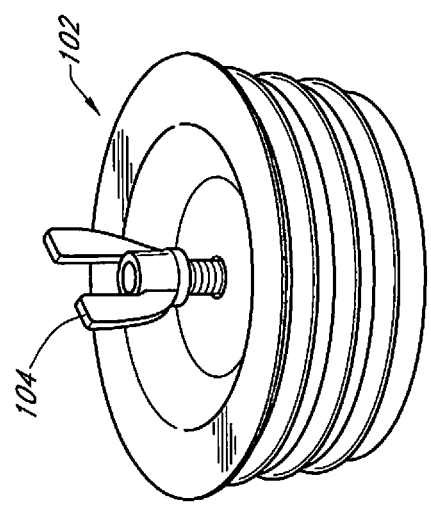

Mechanically locking plugs 102, 106 may also be utilized to provide a better seal, with easier removal for disassembly. FIG. 7a shows a rubber expansion plug 102 which expands within the cleaning aperture 72 when inserted and the wing nut 104 is tightened. FIG. 7b depicts a lever activated expansion plug 106, which provides for rapid removal of the plug when the lever 108 is opened.

Figure 8:
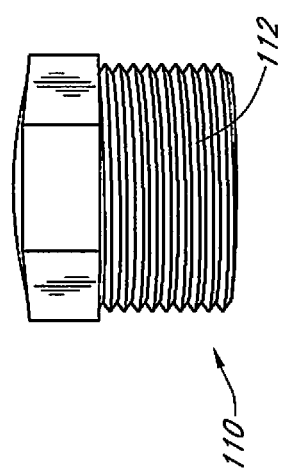
FIG. 8 is a side view of a threaded plug for use in closing another form of the invention's cleaning aperture.

Cleaning aperture 72 may also be threaded allowing for the use of a threaded closure plug 110 as is shown in FIG. 8. In this instance a cap, preferably with male threads 112, is threaded into the cleaning aperture 72. A threaded cap provides one of the most robust retention methods for any style of plug 78 and may be utilized in extreme duty applications.

Figure 9A:
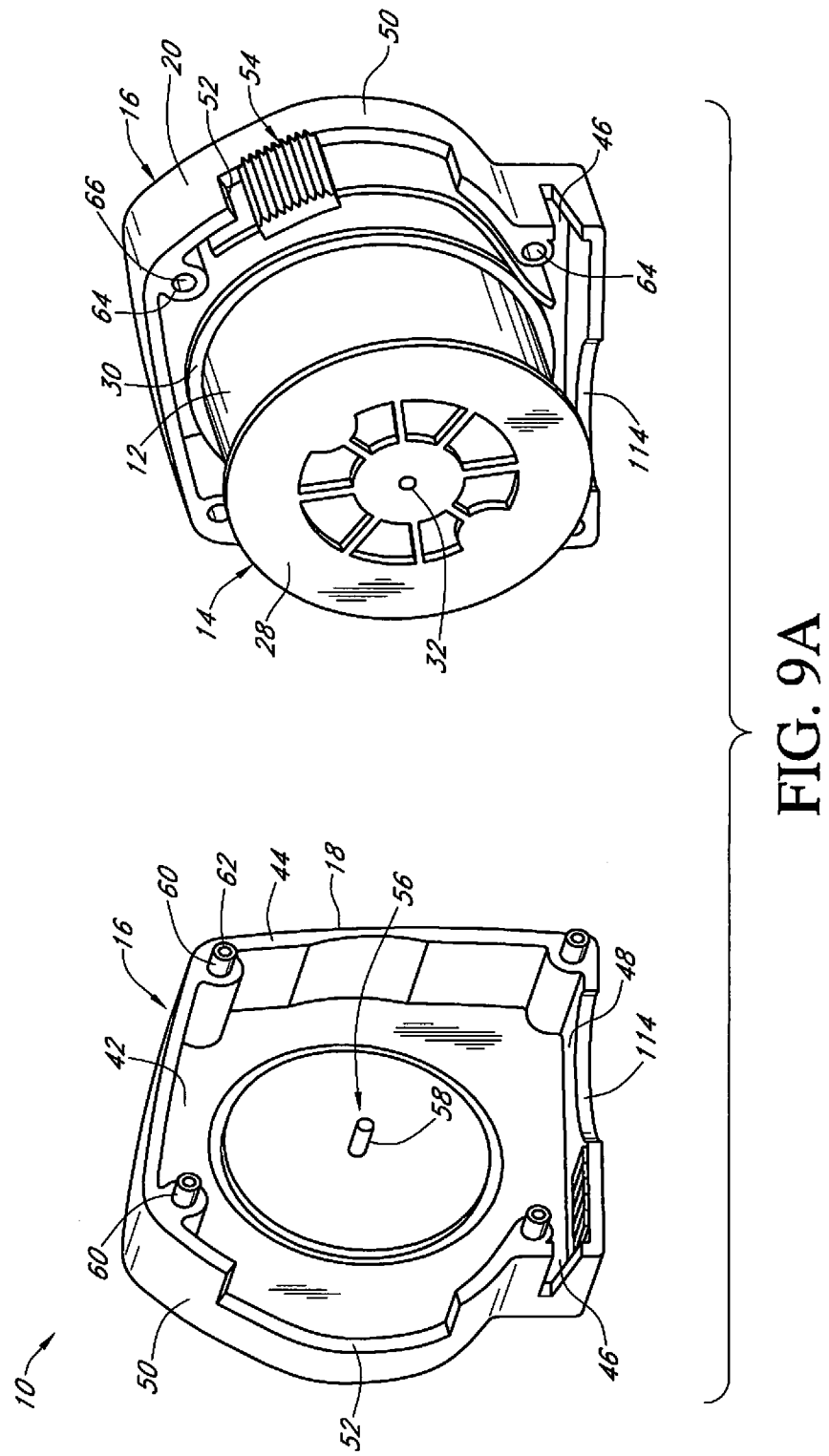
FIG. 9a is a partially exploded view of an another form of the invention having a non-circular cleaning aperture in the base.
Figure 9B:
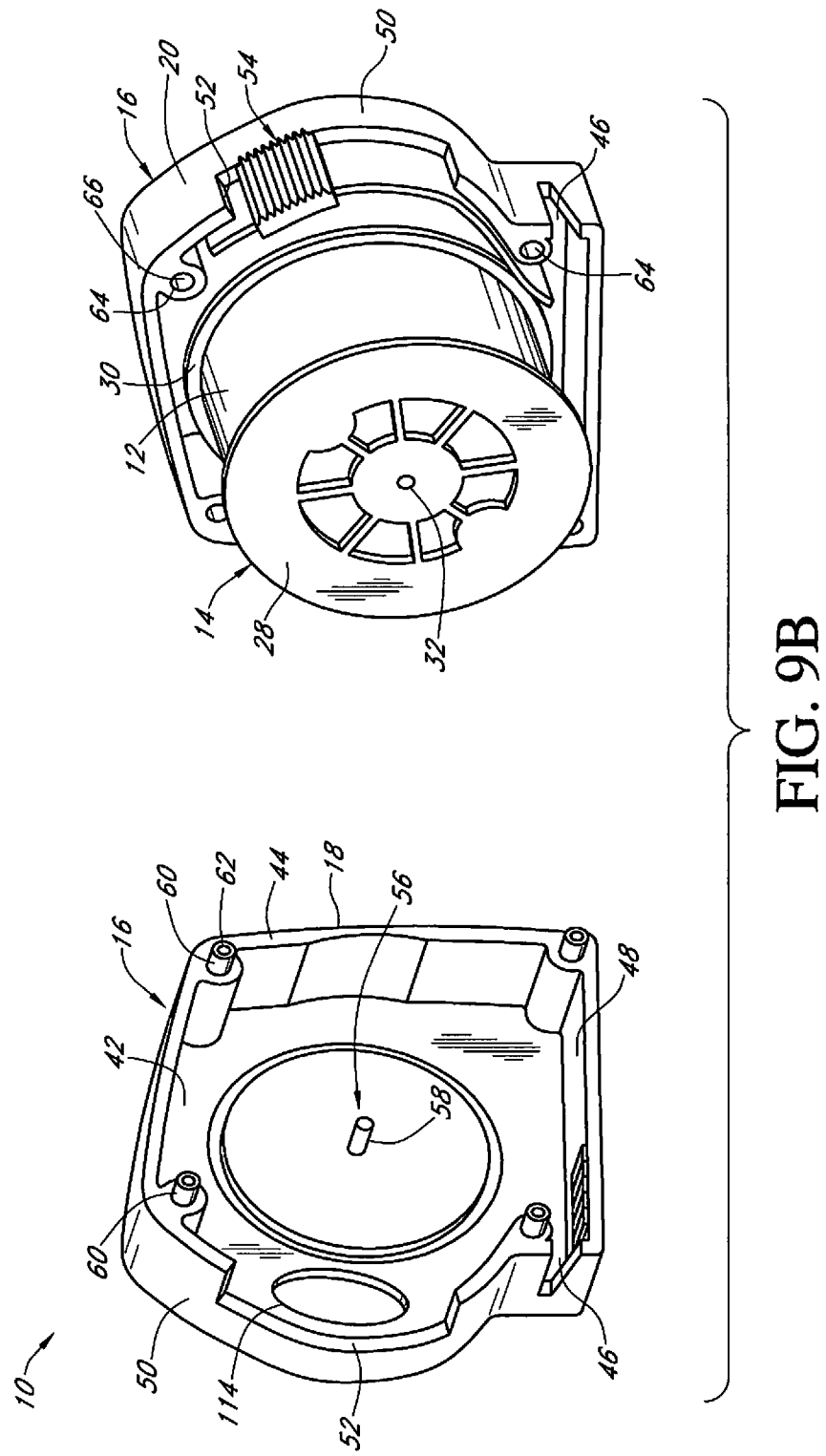
FIG. 9b is a partially exploded view of an another form of the invention having a non-circular cleaning aperture in the sidewall.
Figure 10:
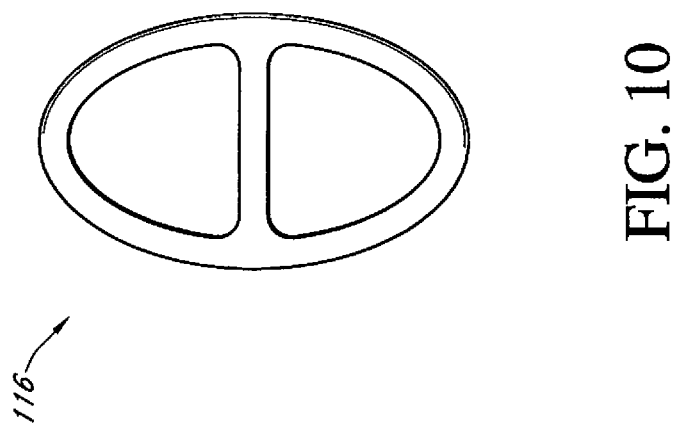
FIG. 10 is a top view of an exemplary rubber cap for use with the invention's non-circular cleaning aperture.

The embodiments of the invention shown in FIGS. 9a and 9b depicts another form of the invention that contains a non circular cleaning aperture 114. Non-circular shapes are useful as they may be shaped to maximize access to the internal areas of housing 16, thereby allowing for easier cleaning. Non circular seals such as the rectangular rubber cap 116 shown in FIG. 10 may be utilized with non circular cleaning apertures 114 in order to seal the opening.

Another embodiment of the invention as shown in FIG. 11 includes a door 118 covering the cleaning aperture 72. This door is connected to a hinge 120 which is pivotally connected to the protective housing 16. The hinge may be internal or external to the housing and the door may be set to pivot in any direction.

In an additional embodiment of the invention, the door 118 may include a retaining feature 122, such as a latch, catch or bolt mechanism to secure the door in a position covering the cleaning aperture 72. This retaining feature may, in one form of the invention, be biased to a closed or latched position by a biasing member 124 such as a spring, which is preferably installed onto the hinge 120. The resistance of the biasing member would preferably be chosen to easily overcome by a force generated and applied by user's finger such that tools are not necessary to open the door 118, yet stiff enough to return the aperture to the closed position.

A further embodiment of the invention including a door 118 includes a safety member 126, which interfaces with the retaining feature 122. The safety member 126 in one embodiment of the invention is capable of moving in a direction that intersects the direction of the motion of the securing member, and may additionally contain a safety member biasing member 128 such as a spring to hold the safety member 126 in position, thereby securing the retaining feature 122 and preventing inadvertent opening of the cleaning aperture's 72 door 118.

In the embodiments of the invention as shown in FIGS. 12a and 12b the cleaning aperture 72 may be closed by a sliding door 130 which slides along a face of the protecting housing 16 between the closed positions shown in FIGS. 12a and 12b and an open positions (not shown). The sliding door 130 is guided in linear movement by internal guide rails to allow access to the interior of the protective housing 16. The sliding door 130 preferably contains a latch (not shown) or other mechanism to retain the sliding door in a closed position when not in use.

While this invention has been described in specific detail with reference to the disclosed embodiments, it will be understood that many variations and modifications may be effected within the spirit and scope of the invention as described in the appended claims. For example, the number and location of the apertures in the housing may vary. Additionally, the aperture's closure device may use or be formed from any of the known methods for closing or encapsulating an aperture, including but not limited to the above disclosed methods. Further, the materials and construction used in the construction of the aperture closure device itself may be comprised of any suitable material, such as wood, metal, plastic, rubber, or foam. Further, the shape of the exterior surfaces of the aperture closure device may contain or be textured, colored, or decorated in any manner which does not impede its function of sealing the tape measure's cleaning aperture. Accordingly, it will be understood that the invention is not to be limited to the embodiments disclosed herein, but is to be understood from the following claims, which are to be interpreted as broadly as allowed under the law.

The invention claimed is:

1. A tape measure assembly comprising:
   a spool;
   a measuring tape coiled upon said spool;
   a protective housing surrounding and rotatably mounting said spool, further containing a tape aperture; and
   a cleaning aperture placed through said protective housing.
2. The assembly as defined in claim 1, wherein said cleaning aperture is circular in shape.
3. The assembly as defined in claim 1, wherein said cleaning aperture is rectangular in shape.
4. The assembly as defined in claim 1, wherein said cleaning aperture is oblong in shape.
5. The assembly as defined in claim 1, wherein said cleaning aperture is irregular in shape.
6. The assembly as defined in claim 1, wherein said cleaning aperture is polygonal in shape.
7. The assembly as defined in claim 1, further containing a plug.
8. The assembly as defined in claim 7 wherein said plug seals said cleaning aperture.
9. The assembly as defined in claim 1, further containing a sliding door.
10. The assembly as defined in claim 1, further containing a hinged door.
11. The assembly as defined in claim 9, further comprising a biasing member closing said sliding door.
12. The assembly as defined in claim 10, further comprising a biasing member closing said hinged door.
13. The assembly as defined in claim 10, wherein said hinged door further contains a door latch.
14. The assembly as defined in claim 13, wherein said hinged door further contains a safety member which engages said door latch.
15. A tape measure assembly comprising:
   a spool;
   a measuring tape coiled upon said spool;
   a protective housing surrounding and rotatably mounting said spool, further containing a tape aperture;
   a cleaning aperture placed through said protective housing;
   a door sealing said cleaning aperture;
   wherein said door may be opened to clean said spool without disassembly of said protective housing.
16. The assembly as defined in claim 15, wherein said cleaning aperture is located in a peripheral wall of said protective housing.
17. The assembly as defined in claim 15, wherein said cleaning aperture is located in a sidewall of said protective housing.
18. A tape measure assembly comprising:
   a spool;
   a measuring tape coiled upon said spool;
   a protective housing surrounding and rotatably mounting said spool, further containing a tape aperture;
   a cleaning aperture placed through said protective housing;
   a plug sealing said cleaning aperture;
   wherein said plug may be removed to clean said spool without disassembly of said protective housing.
19. The assembly as defined in claim 18, wherein said cleaning aperture is located in a peripheral wall of said protective housing.
20. The assembly as defined in claim 18, wherein said cleaning aperture is located in a sidewall of said protective housing.

* * * * *